United States Patent
Fukui et al.

(10) Patent No.: US 8,656,126 B2
(45) Date of Patent: Feb. 18, 2014

(54) MANAGING SNAPSHOTS OF VIRTUAL SERVER

(75) Inventors: Yuto Fukui, Kanagawa (JP); Shinkichi Hamada, Kanagawa (JP); Yohkichi Sasatani, Kanagawa (JP); Shoji Sugiyama, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 13/238,298

(22) Filed: Sep. 21, 2011

(65) Prior Publication Data

US 2012/0084521 A1 Apr. 5, 2012

(30) Foreign Application Priority Data

Sep. 30, 2010 (JP) ................. 2010-220350

(51) Int. Cl.
*G06F 13/00* (2006.01)
*G06F 13/28* (2006.01)

(52) U.S. Cl.
USPC .............. 711/162; 711/E12.103; 718/1

(58) Field of Classification Search
USPC ................ 711/162, E12.103; 718/1
See application file for complete search history.

(56) References Cited

U.S. PATENT DOCUMENTS

| | | | |
|---|---|---|---|
| 2006/0218544 A1* | 9/2006 | Chakraborty et al. | 717/168 |
| 2009/0241030 A1* | 9/2009 | von Eicken et al. | 715/735 |
| 2010/0083251 A1* | 4/2010 | McCrory et al. | 718/1 |
| 2010/0251004 A1* | 9/2010 | Schuba et al. | 714/3 |
| 2010/0257523 A1* | 10/2010 | Frank | 718/1 |
| 2010/0299309 A1* | 11/2010 | Maki et al. | 707/640 |
| 2011/0185228 A1* | 7/2011 | Watanabe et al. | 714/19 |

FOREIGN PATENT DOCUMENTS

| | | |
|---|---|---|
| JP | 2003-223209 | 8/2003 |
| JP | 2007-066265 | 3/2007 |
| JP | 2008-084029 | 4/2008 |
| JP | 2009-080705 | 4/2009 |
| JP | 2009-086701 | 4/2009 |
| JP | 2009-080692 | 6/2009 |
| JP | 2009-288836 | 12/2009 |
| JP | 2010-009552 | 1/2010 |
| JP | 2010-086050 | 4/2010 |

* cited by examiner

*Primary Examiner* — Edward Dudek, Jr.
(74) *Attorney, Agent, or Firm* — Stephen R. Tkacs; Stephen J. Walder, Jr.; Yeen Tham

(57) ABSTRACT

Configuration information and a system log are acquired for each of virtual servers running on an external computer, and the acquired system logs are analyzed. Relation information on the relation between the acquired configuration information and a configuration item indicating an existing snapshot, which is acquired from the same virtual server and stored, is extracted on the basis of the analysis result. Identification information for identifying the acquired configuration information is generated on the basis of the extracted relation information, and the acquired configuration information and system log are stored as a configuration item indicating a snapshot in association with the generated identification information.

20 Claims, 12 Drawing Sheets

MANAGING SNAPSHOTS OF VIRTUAL SERVER

BACKGROUND

The present invention relates to a mechanism for managing configuration information of virtual servers managed using a configuration management database (hereinafter referred to as a CMDB) and a plurality of snapshots of one virtual server as distinguished from one another.

With the development of a virtualization technology, various systems are being developed which allow a plurality of operation systems (hereinafter referred to as OSs) to be simultaneously run on one computer. The individual OSs that are simultaneously running are called virtual servers.

To monitor the running states of virtual servers, it is necessary to separately run management programs, such as a host OS and a hypervisor. Such management programs can store the states of virtual servers at a specified time as snapshot data (hereinafter referred as snapshots). By replacing the stored snapshots for use, the virtual servers can be easily returned to the states at the specified time.

Furthermore, some management programs store the configuration information of the virtual servers at a specified time as image files. The virtual servers can easily be returned to states at a desired time by replacing the stored image files for use. The configuration information can be acquired any time and can be stored as image files in chronological order.

For example, Japanese Unexamined Patent Application Publication No. 2009-288836 discloses a method for recovering from a system fault in virtual servers, in which snapshots and setting-change information are stored to roll back the virtual servers. Japanese Unexamined Patent Application Publication No. 2009-086701 discloses a virtual computer system including two physical computers, in which if a problem occurs in one physical computer, a state immediately before the occurrence of the problem can be reproduced on the other physical computer on the basis of snapshots and log data.

SUMMARY

In accordance with on embodiment, an apparatus comprises a processor and a memory coupled to the processor. The memory comprises instructions which, when executed by the processor, cause the processor to acquire configuration information and a system log for a virtual server running on an external computer connected via a network to form a snapshot of the virtual server; compare the acquired system log and an existing system log specified on the basis of the acquired configuration information; extract relation information on the relation between the acquired configuration information and another configuration information acquired from the same virtual server; and store a snapshot comprising the acquired configuration information and system log in a configuration information storage unit in association with identification information for identifying the configuration information of the virtual server.

In accordance with another illustrative embodiment, a method comprises acquiring configuration information and a system log for a virtual server running on an external computer connected via a network to form a snapshot of the virtual server; comparing the acquired system log and an existing system log specified on the basis of the acquired configuration information; extracting relation information on the relation between the acquired configuration information and another configuration information acquired from the same virtual server; and storing a snapshot comprising the acquired configuration information and system log in association with snapshot identification information for identifying the configuration information of the virtual server.

In another illustrative embodiment, a computer program product comprising a computer useable or readable device having a computer readable program stored thereon is provided. The computer readable program, when executed on a computing device, causes the computing device to perform various ones of, and combinations of, the operations outlined above with regard to the method illustrative embodiment.

DETAILED DESCRIPTION

Figure 1:
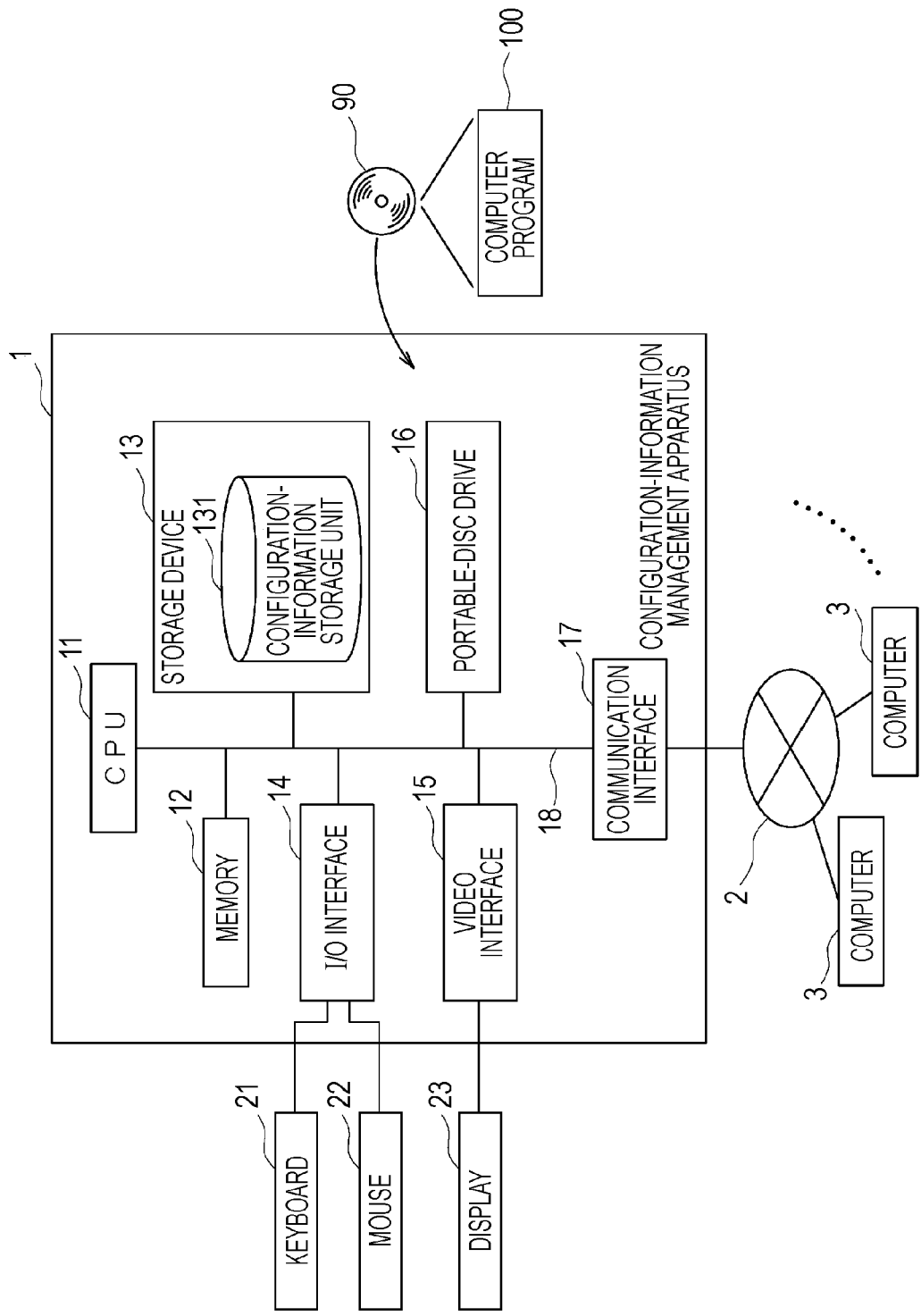
FIG. 1 is a block diagram showing an example in which a configuration-information management apparatus according to an embodiment is constituted by a CPU.

The replacement of a plurality of snapshots for use in one virtual server has a problem in that it is difficult to correctly determine at what point in time the configuration information of the individual snapshots is, the snapshots are not always stored correctly in chronological order. For example, in the case where snapshots to which a necessary patch program is applied and snapshots to which a necessary patch program is not applied are mixed, replacing the snapshots may cause a security risk. Furthermore, even if a change in configuration information due to replacement of snapshots influences the other application, it cannot be specified which of the snapshot replacements is the cause.

Furthermore, when configuration information is to be acquired from a computer connected via a network, a plurality of snapshots cannot be distinguished when information for specifying OSs is the same. In other words, there is a problem in that only one snapshot can be acquired for one virtual server as configuration information, and thus individual snapshots, cannot be distinguished.

The illustrative embodiments are made in consideration of such circumstances, and an object thereof is to provide a mechanism for managing snapshots of a virtual server using a configuration management database so that even if a plurality of snapshots are replaced for use depending on usage, the snapshots can be stored as distinguished from one another.

According to the illustrative embodiments, a plurality of snapshots on one virtual server can be reliably distinguished. This allows correct ascertainment of the life cycle management of software running on the virtual server, management of the application level of a patch program applied to the OS, and a change in configuration information due to repetition of attachment and detachment of hardware even if the plurality of snapshots are replaced for use in one virtual server.

An apparatus for managing the configuration information of the individual snapshots of a virtual server according to embodiments of the present invention will be specifically described with reference to the drawings. It is needless to say that the embodiments below do not limit the invention described in the claims and that all the combinations of characteristics described in the embodiments are not essential for solutions.

Furthermore, the illustrative embodiments can be embodied in many different forms and should not be limited to the description in the embodiments. The same components are given the same reference signs throughout the embodiment.

Although the following embodiments are described when applied to an apparatus in which a computer system implements a computer program, it is obvious to those skilled in the art that part of the present invention can be embodied as a computer program that can be executed by a computer. Accordingly, the invention can be embodied as hardware, which is an apparatus for managing configuration information of the individual snapshots of a virtual server, software, and a combination of hardware and software. The computer program can be stored in any computer-readable recording media, such as a hard disk, a DVD, a CD, an optical storage unit, and a magnetic storage unit.

According to the embodiments, a plurality of snapshots on one virtual server can be reliably distinguished. This allows correct ascertainment of the life cycle management of software running on the virtual server, management of the application level of a patch program applied to the OS, and a change in configuration information due to repetition of attachment and detachment of hardware even if the plurality of snapshots are replaced for use in one virtual server.

FIG. 1 is a block diagram showing an example in which a configuration-information management apparatus according to a first embodiment is constituted by a CPU. A configuration-information management apparatus 1 according to the embodiment is connected to a plurality of external computers 3 so as to be capable of data communication via a network 2.

The configuration-information management apparatus 1 includes at least a central processing unit (CPU) 11, a memory 12, a storage device 13, an I/O interface 14, a video interface 15, a portable-disc drive 16, a communication interface 17, and an internal bus 18 that connects the foregoing hardware.

The CPU 11 is connected to the foregoing hardware components of the configuration-information management apparatus 1 via the internal bus 18. The CPU 11 controls the operations of the foregoing hardware components and implements various software functions in accordance with a computer program 100 stored in the storage device 13. The memory 12 is a volatile memory, such as a SRAM or an SDRAM, in which a load module is expanded when the computer program 100 is executed to store temporary data generated during the execution of the computer program 100.

The storage device 13 is a built-in fixed storage device (hard disk), a ROM, or the like. The computer program 100 stored in the storage device 13 is downloaded using a portable-disc drive 16 from a portable recording medium 90, such as a DVD or a CD-ROM, in which information, such as programs and data, is stored, and at runtime it is expanded from the storage device 13 to the memory 12. Of course, computer programs downloaded from the external computers 3 connected to the network 2 via the communication interface 17 may be used.

The storage device 13 is equipped with a configuration-information storage unit 131 that stores configuration information and system logs acquired for the individual OSs running on the external computers 3. The configuration information to be stored in the configuration-information storage unit 131 includes both hardware configuration information and software configuration information, such as the kinds and versions of the OSs, a patch-program application state, running-computer identification information, IP addresses, and application identification information. The configuration-information storage unit 131 may be configured as a configuration management database, in which the system logs and configuration information may be stored as configuration items indicating snapshots.

The communication interface 17 is connected to the internal bus 18 and is capable of data transmission and reception to/from the external computers 3 when connected to the network 2, such as the Internet, a LAN, or a WAN.

The I/O interface 14 is connected to a data input media, such as, a keyboard 21 and a mouse 22, to accept data entry. The video interface 15 is connected to a display 23, such as a CRT monitor or an LCD, and displays a given image.

Figure 2:
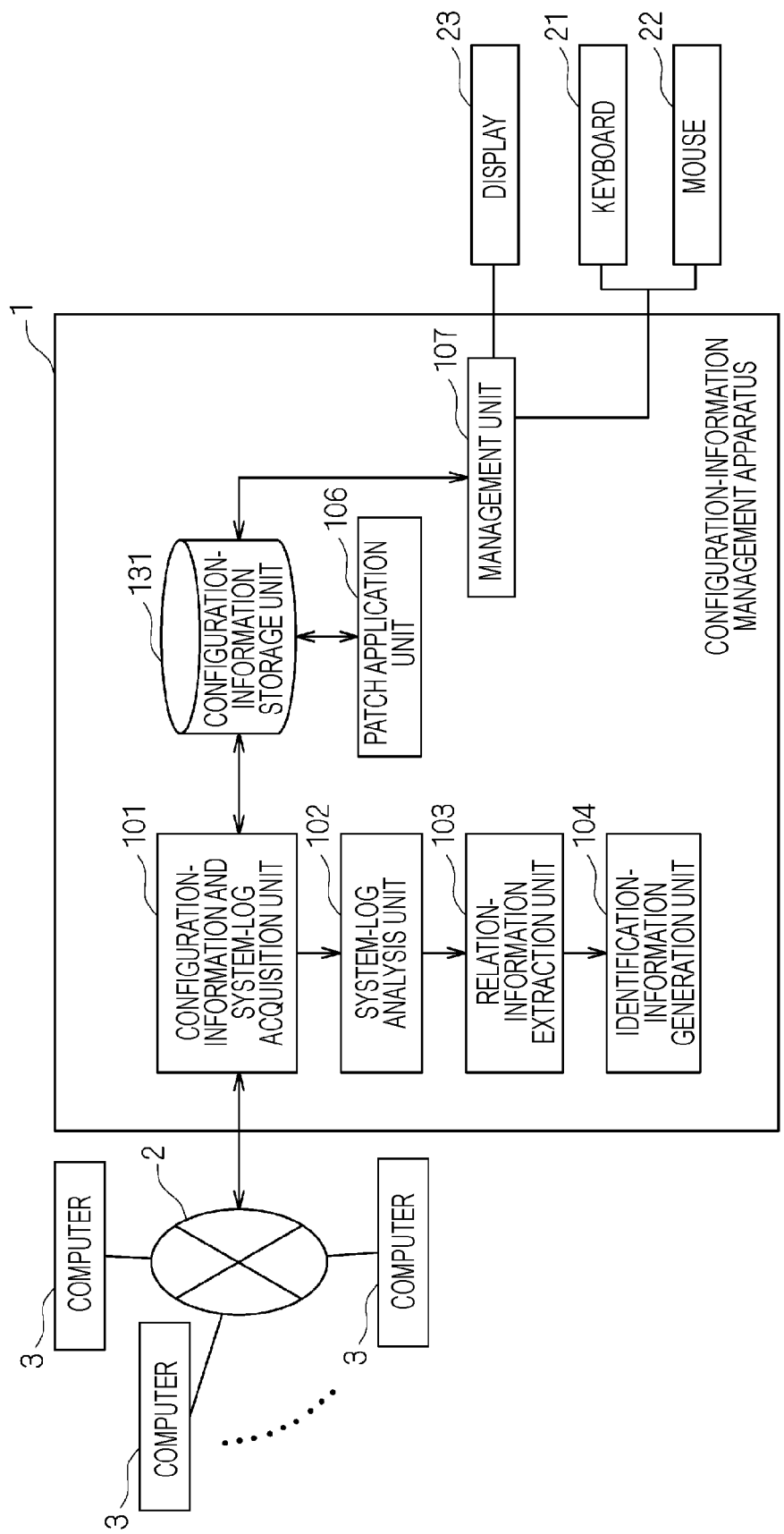
FIG. 2 is a functional block diagram of the configuration-information management apparatus according to an embodiment.

A method for managing the configuration information of OSs running on the plurality of external computers 3 with the thus-configured configuration-information management apparatus 1 will be described hereinbelow. FIG. 2 is a functional block diagram of the configuration-information management apparatus 1 according to the above embodiment.

The configuration-information management apparatus 1 is connected so as to be capable of data communication with the plurality of external computers 3 via the network 2. One or a plurality of OSs can be run on each of the external computers 3. The individual OSs running on the individual external computers 3 are referred to as "virtual servers" in this specification, and configuration information and a system log at a specified time are acquired for each of the running OSs. A snapshot refers to an image stored at a predetermined time of a virtual server, and a configuration item indicating the snapshot is stored in the configuration-information storage unit 131.

In FIG. 2, the configuration-information storage unit 131 is configured as a configuration management database (CMDB), that is, a database based on IT infrastructure library (ITIL) (a registered trademark) definition, in which configuration items indicating snapshots are classified by type, and the attributes of the configuration items are defined as attribute information of the individual classes. By storing configuration items indicating snapshots and the attribute information of the configuration items, a system log can be stored as one of the attribute information of the configuration item, and relation information on the relation between configuration items indicating snapshots can also be stored as one of the attribute information. The relation information includes information on the derivative information of the snapshot and information on the order of generation.

A configuration-information and system-log acquisition unit 101 searches virtual servers running on the external computers 3 connected so as to be capable of data communication via the network 2 and acquires detailed configuration information of hardware and software and system logs for the individual virtual servers. Examples of the configuration information to be acquired include the manufacturers, models, serial numbers, system board IDs, MAC addresses, host names, OS types, license numbers, OS installation dates, and application names of the computers.

The acquired configuration information and system logs are stored in the configuration-information storage unit 131 of the storage device 13. The conventional methods can store only one configuration item indicating one virtual server for one virtual server. Accordingly, for example, in the case where after a patch program is applied to an OS, the snapshot is replaced with a snapshot to which the patch program is not applied, the configuration information and system log of the OS before the patch program is applied thereto are stored as a configuration item indicating the virtual server in the configuration-information storage unit 131 although it is an OS to which the patch program is applied.

Thus, in the first embodiment, the acquired configuration information and system logs are stored in the configuration-information storage unit 131 in association with identification information for identifying configuration items indicating the snapshots of the virtual servers. Specifically, snapshot IDs are given to corresponding configuration items indicating snapshots, and, for example, generation management of configuration items that are stored using the snapshot IDs as key information is executed.

More specifically, the configuration-information and system-log acquisition unit 101 acquires configuration information and system logs for individual virtual servers running on the external computers 3 connected so as to be capable of data communication via the network 2. The acquired configuration information and system logs are stored in the configuration-information storage unit (CMDB) 131 as configuration items indicating the snapshots of the individual virtual servers.

A system-log analysis unit (analysis unit) 102 analyzes the acquired system log on the basis of a process ID for identifying a process, timestamp, etc. Specifically, the analysis unit 102 compares the acquired system log with an existing system log that is acquired from the same virtual server and stored. Furthermore, a relation-information extraction unit 103 extracts relation information on the relation between the acquired configuration information and the configuration item indicating the stored existing snapshot (configuration information) on the basis of the result of analysis of the system log. Specifically, the relation-information extraction unit 103 extracts information on the derivative information of the snapshot and information on the order of generation.

When it is determined from the extracted relation information that the acquired configuration information is a new snapshot, an identification-information generation unit 104 generates identification information for identifying the acquired configuration information, that is, a snapshot ID. For example, the identification-information generation unit 104 generates a snapshot ID that indicates the order of a snapshot before the configuration information is updated and a snapshot after the update.

A patch application unit 106 applies a patch program that has not been applied to the snapshot of a virtual server although it should be applied thereto. A management unit 107 displays, on a display 23, a configuration item indicating a snapshot stored in the configuration-information storage unit 131 and accepts data input via the keyboard 21 and the mouse 22.

Figure 3:
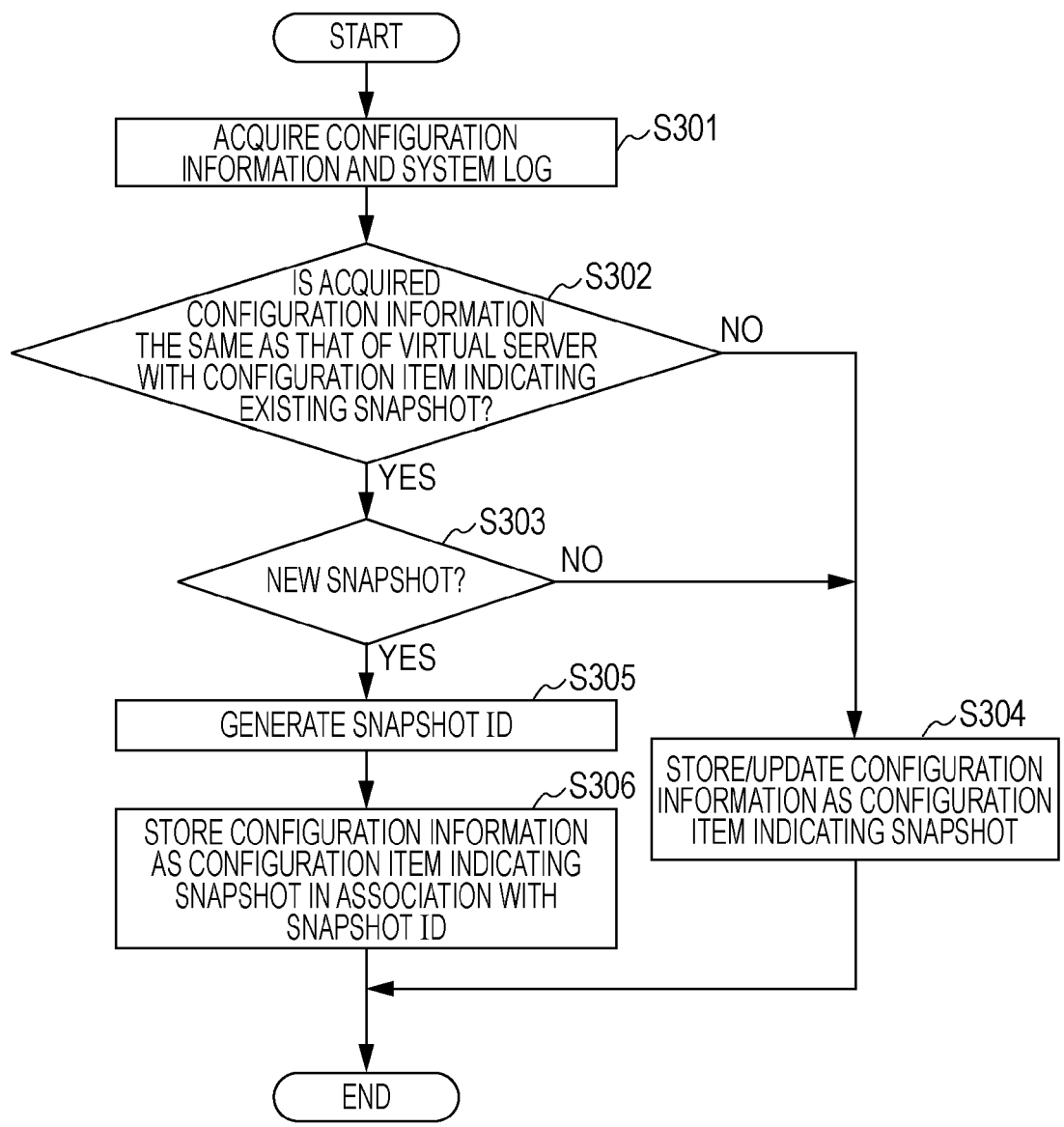
FIG. 3 is a flowchart showing the procedure of the process of the CPU of the configuration-information management apparatus according to an embodiment for acquiring configuration information and system logs and storing them.

FIG. 3 is a flowchart showing the procedure of the process of the CPU 11 of the configuration-information management apparatus 1 according to the first embodiment for acquiring configuration information and system logs and storing them. FIG. 3 describes a case where one virtual server is running on each of the external computers 3.

In FIG. 3, the CPU 11 of the configuration-information management apparatus 1 searches the virtual server running on each of the external computers 3 and acquires configuration information and a system log for each virtual server (step S301). The CPU 11 determines whether the acquired configuration information is the same as that of a virtual server with a configuration item indicating an existing snapshot stored in the configuration-information storage unit 131 (step S302).

The determination of whether the acquired configuration information is the same as that of a virtual server with a configuration item indicating an existing snapshot is made on the basis of whether, for example, the manufacturer, model, serial number, system board ID, MAC address, host name, OS type, license number, OS installation dates, etc. of the computer included in the configuration item indicating the stored existing snapshot match the acquired configuration information. If they do not match, it can be determined that it is the configuration information of a completely different virtual server, that is, it is not the same virtual server as a virtual server with the configuration item indicating the existing snapshot.

Figure 4:
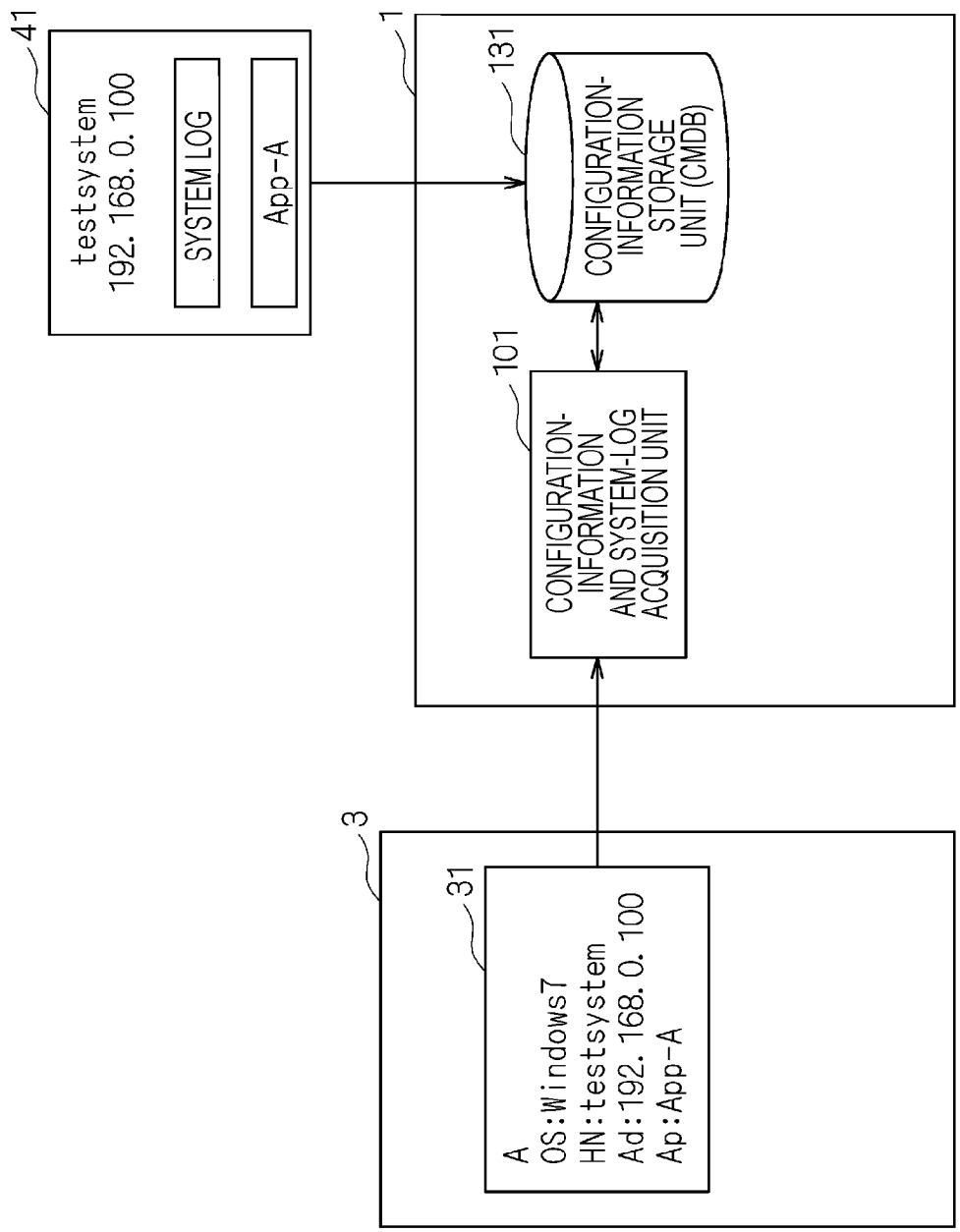
FIG. 4 is a schematic diagram showing the concept of the process of the configuration-information management apparatus according to an embodiment for acquiring configuration information and system logs and storing them.

FIG. 4 is a schematic diagram showing the concept of the process of the configuration-information management apparatus 1 according to an example embodiment for acquiring configuration information and system logs and storing them. As shown in FIG. 4, the configuration-information and system-log acquisition unit 101 of the configuration-information management apparatus 1 searches a virtual server running on the external computer 3 and reads configuration information 31. The configuration-information and system-log acquisition unit 101 stores the read configuration information 31 in the configuration-information storage unit 131 as a configuration item 41 indicating a snap shot together with a system log.

In the example of FIG. 4, a snapshot A is present in which host name is "testsystem", an application "App-A" is active, and IP address is "192.168.0.100". The configuration-information and system-log acquisition unit 101 reads the configuration information 31 from the snapshot A and stores it in the configuration-information storage unit 131 as the configuration item 41 indicating the snapshot A together with a system log.

Referring back to FIG. 3, in the case where the CPU 11 of the configuration-information management apparatus 1 determines that the acquired configuration information is not same as that of virtual server with a configuration item indicating an existing snapshot stored in the configuration-information storage unit 131 (step S302: NO), the CPU 11 stores the configuration information as a configuration item indicating a new snapshot in the configuration-information storage unit 131, as in the related art (step S304). Specifically, the CPU 11 adds it as a new configuration item to the configuration-information storage unit 131. In this case, the snapshot ID is not particularly limited provided that it is another ID that can distinguish the snapshot from a snapshot ID given to the configuration item indicating the existing snapshot and may be inputted, for example, at the point where it is stored in the configuration-information storage unit 131.

In the case where the CPU 11 determines that the acquired configuration information is the same as that of a virtual server with the configuration item indicating the existing snapshot stored in the configuration-information storage unit 131 (step S302: YES), the CPU 11 determines whether it is a new snapshot (step S303). The determination of whether it is a new snapshot is made on the basis of the result of analysis of the system log. More specifically, the CPU 11 makes the determination by comparing the event ID and the timestamp of the existing system log stored in the configuration-information storage unit 131 as a configuration item indicating the snapshot of the same virtual server with the event ID and the timestamp of the newly acquired system log, respectively.

For example, for a newly acquired system log of the same virtual server, for example, in the case where part of stored log information is lost or in the case where log information before a stored timestamp is added, it can be determined that it is a new snapshot. On the other hand, for example, in the case where log information after a stored timestamp is added, it can be determined that it is an existing snapshot. In the case where the CPU 11 determines that it is an existing snapshot (step S303: NO), the CPU 11 merges a configuration item indicating the existing snapshot and the acquired configuration information together and stores it as a configuration item indicating one snapshot in the configuration-information storage unit 131 (step S304). In other words, the CPU 11 updates the configuration item indicating the snapshot stored in the configuration-information storage unit 131 in association with the existing snapshot ID.

Figure 5:
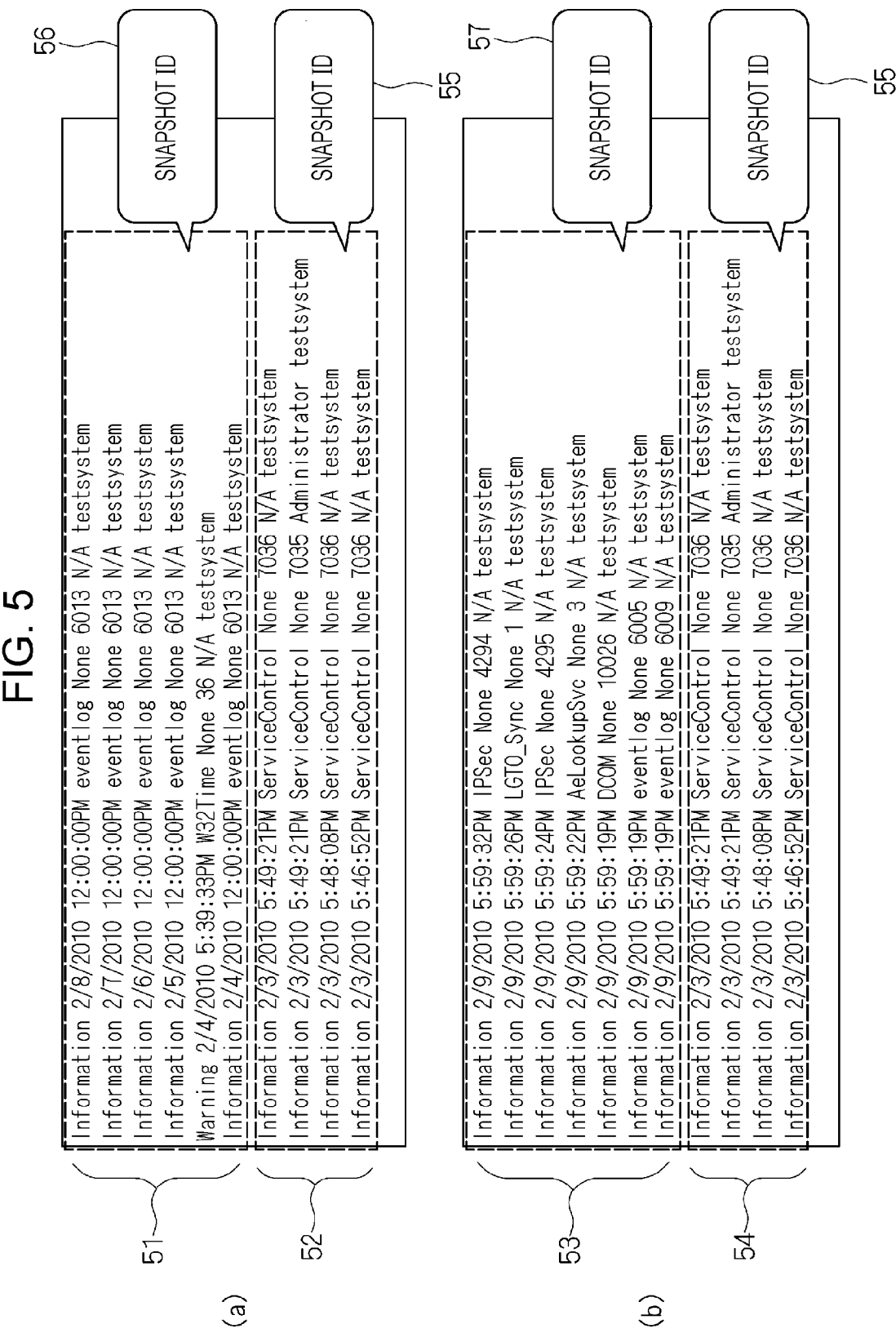
FIG. 5($a$) and FIG. 5($b$) are diagrams showing examples of system logs stored in the configuration-information management apparatus according to an embodiment.

FIGS. 5(*a*) and 5(*b*) are diagrams showing examples of a system log stored in the configuration-information management apparatus 1 according to an example embodiment. FIG. 5(*a*) is a diagram showing examples of a system log included in a configuration item indicating an existing snapshot, and FIG. 5(*b*) is a diagram showing examples of an acquired system log.

A comparison of FIG. 5(*a*) and FIG. 5(*b*) shows that it can be determined from the transition of the timestamp, event ID, etc. that log information 52 and log information 54 match. Specifically, the event ID changes from '7036', '7035', '7036', to '7036', and the timestamps also match in both of the log information 52 and the log information 54. Accordingly, it can be determined that the snapshot including the log information 54 is the same as the snapshot including the log information 52, and thus, the snapshot is stored as a configuration item indicating the snapshot in the configuration-information storage unit 131 in association with an existing snapshot ID 55.

On the other hand, it can be determined from the transition of the timestamp, event ID, etc. that the log information 51 and the log information 53 are completely different log information. In other words, it is obvious that the log information 51 and the log information 53 completely differ in the transition of the timestamp, event ID, etc. Accordingly, the snapshot including the log information 53 needs to have a snapshot ID 57 different from a snapshot ID 56 including the log information 51.

In the case where the CPU 11 determines that the acquired configuration information is not an existing snapshot, that is, it is a new snapshot (step S303: YES), the CPU 11 generates a new snapshot ID (step S305) and stores it as a configuration item indicating the snapshot in the configuration-information storage unit 131 in association with the generated snapshot ID (step S306).

The snapshot ID generated in step S305 may be a combination of, for example, level information for making a distinction from the other snapshots and the hash value of timestamp information for making a distinction on the basis of log information. Of course, a generation Id indicating generation relation, a serial number, etc. may be used instead of the hash value.

Figure 6:
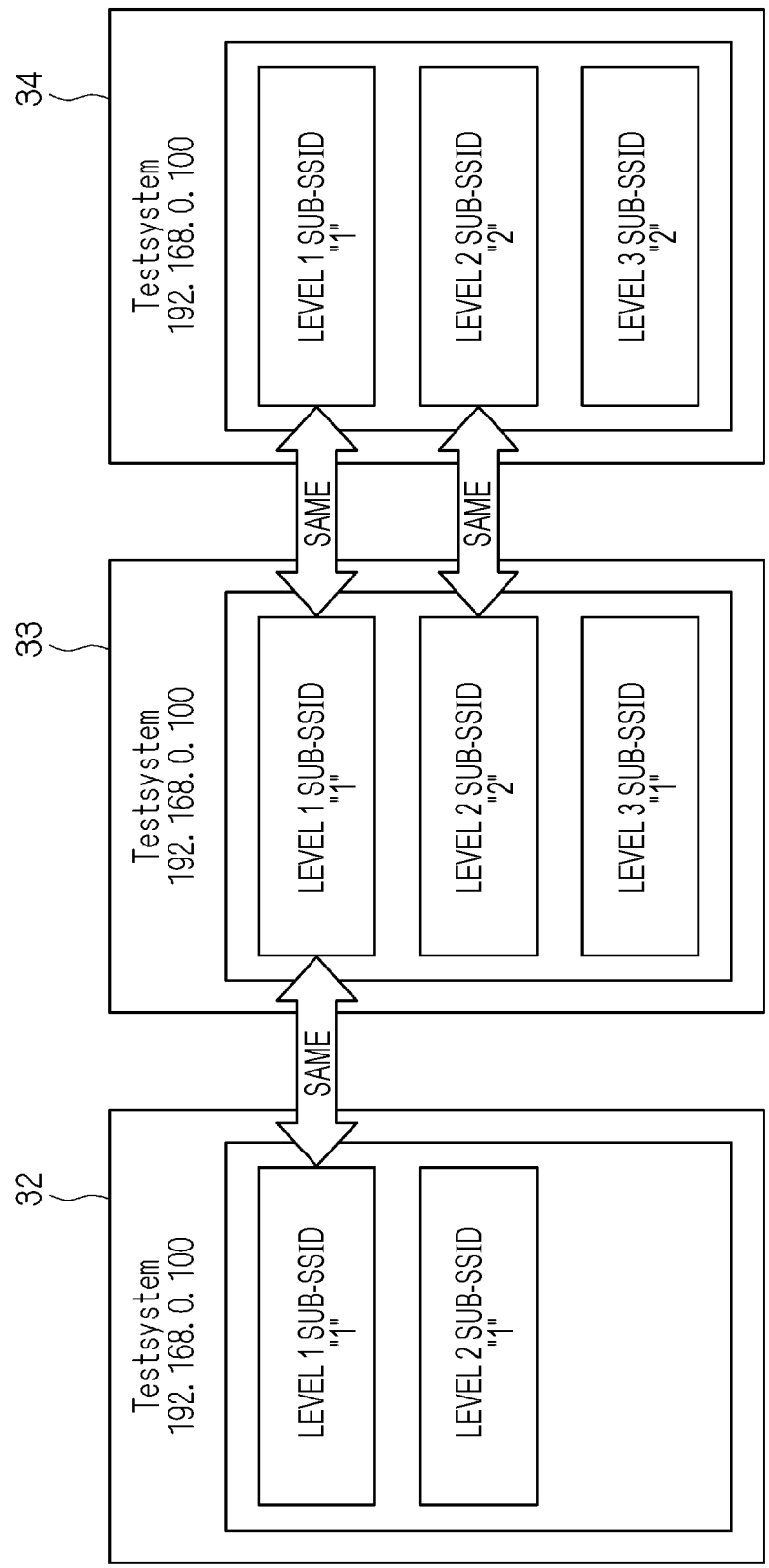
FIG. 6 is a diagram showing an example of snapshot IDs of individual configuration items (CI) indicating snapshots of the configuration-information management apparatus according to an embodiment.

FIG. 6 is a diagram showing an example of snapshot IDs of individual configuration items indicating snapshots of the configuration-information management apparatus 1 according to an example embodiment. In FIG. 6, sub-snapshot IDs '1', '2', '3', and so on are used as generation IDs instead of hash values for ease of explanation.

In the example of FIG. 6, all of configuration items 32, 33, and 34 indicating snapshots acquired from one virtual server include a sub-snapshot ID '1' at level 1 as a snapshot ID. The fact that the configuration items 32, 33, and 34 have the same sub-snapshot ID '1' shows that the three configuration items 32, 33, and 34 have common log information.

Next, all of the configuration items 32, 33, and 34 include a sub-snapshot ID at level 2 as a snapshot ID. The sub-snapshot ID at level 2 of the configuration item 32 is '1', while the sub-snapshots ID at level 2 of the configuration items 33 and 34 are '2', which differs therefrom. This shows that there is log information that is not present in the configuration item 32 but is present in common in the configuration items 33 and 34. This shows that the configuration item with the snapshot ID at level 1 is separated into the two sub-snapshot IDs '1' and '2' at level 2, in other words, there is a snapshot derived due to a change in configuration information.

Furthermore, the configuration items 33 and 34 include a sub-snapshot ID at level 3 as a snapshot ID. The sub-snapshot ID at level 3 of the configuration item 33 is '1', while the sub-snapshot ID at level 3 of the configuration item 34 is '2', which differs therefrom. This shows that there is log information that is not present in the configuration item 33 but is present in the configuration item 34. This shows that the configuration item with the snapshot ID at level 2 is separated into the two sub-snapshot IDs '1' and '2' at level 3, in other words, there is a snapshot derived due to a change in configuration information.

Figure 7:
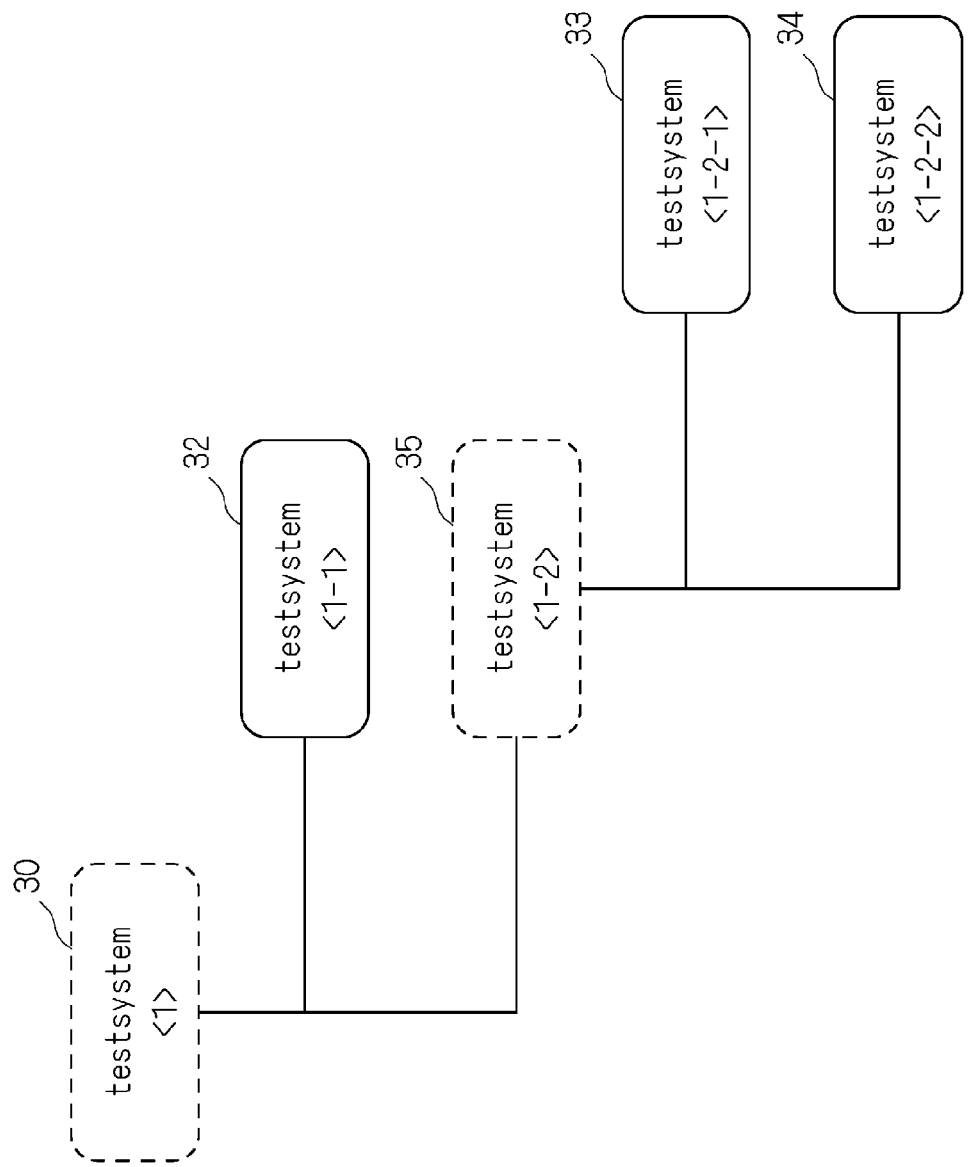
FIG. 7 is a diagram of a tree structure showing the derivation state of configuration items indicating the snapshots of the configuration-information management apparatus according to an embodiment.

FIG. 7 is a diagram of a tree structure showing the derivation state of configuration items indicating the snapshots of the configuration-information management apparatus 1 according to an embodiment. As shown in FIG. 7, a configuration item 30 indicating one snapshot is originally stored in a virtual server with the host name "testsystem". The snapshot ID of the configuration item 30 is a sub-snapshot ID '1' at level 1.

However, configuration items 32 and 35 indicating two snapshots are stored for the virtual server with the host name "testsystem" due to a change in configuration information. The snapshot IDs of the configuration items 32 and 35 become '1-1' and '1-2' obtained by adding sub-snapshot ID '1' and '2' at level 2 to the sub-snapshot ID '1' at level 1, respectively.

Then, the configuration items 33 and 34 indicating two snapshots are stored for the virtual server with the host name "testsystem" due to a change in configuration information. The snapshot IDs of the configuration items 33 and 34 become '1-2-1' and '1-2-2' obtained by adding sub-snapshot ID '1' and '2' at level 3 to the sub-snapshot ID '1' at level 1 and the sub-snapshot ID '2' at level 2, respectively.

Thus, by adding sub-snapshot IDs associated with configuration items indicating derived snapshots in sequence every time configuration information changes, the configuration-information change history can be correctly ascertained using a tree structure having a hierarchical structure, which can prevent the occurrence of, for example, a situation in which a patch program to be applied is not applied irrespective of the intention of the user due to, for example, replacement of snapshots.

Figure 8:
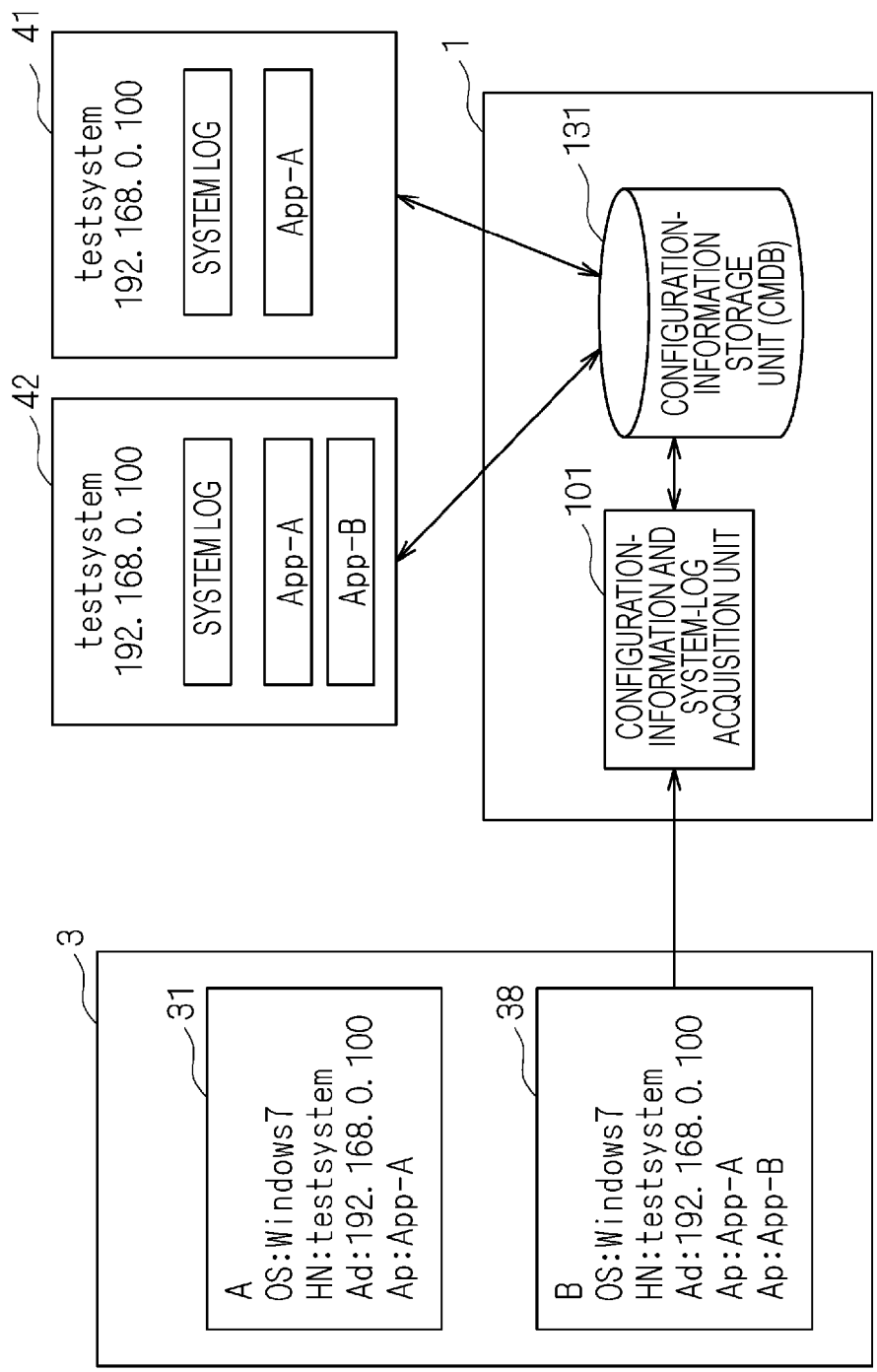
FIG. 8 is a schematic diagram showing the concept of the process of the configuration-information management apparatus according to an embodiment for acquiring configuration information and system logs and storing them when a plurality of snapshots are replaced for use.

FIG. 8 is a schematic diagram showing the concept of the process of the configuration-information management apparatus 1 according to an example embodiment for acquiring configuration information and system logs and storing them when a plurality of snapshots are replaced for use. As shown in FIG. 8, configuration information and system logs can be acquired from a virtual server running on the external computer 3 for the individual snapshots to be replaced for use. In other words, the configuration-information and system-log acquisition unit 101 of the configuration-information management apparatus 1 searches the virtual server running on the external computer 3 and reads configuration information 31 or 38 of each of the snapshots to be replaced for use. The configuration-information and system-log acquisition unit 101 stores the read configuration information 31 or 38 in the configuration-information storage unit 131 as a configuration item 41 or 42 indicating a snapshot of each virtual server together with a system log.

In the example of FIG. 8, a snapshot A in which host name is "testsystem", an application "App-A" is active, and IP address is "192.168.0.100" and a snapshot B in which host name is "testsystem", two applications "App-A" and "App-B" are active, and IP is "192.168.0.100" are replaced for use. The CPU 11 (configuration-information and system-log acquisition unit 101) reads corresponding configuration information 31 or 38 from the snapshot A or B replaced for use and stores it in the configuration-information storage unit 131 as the configuration item 41 or 42 indicating the snapshot of each virtual server together with a system log.

In step S302 in FIG. 3, The CPU 11 determines whether the acquired configuration information is the same as that of a virtual server with a configuration item indicating an existing snapshot stored in the configuration-information storage unit 131. Specifically, the CPU 11 determines whether the manufacturer, model, serial number, system board ID, MAC address, host name, OS type, license number, OS installation dates, etc. of the computer included in the configuration item indicating the stored existing snapshot match the acquired configuration information. In the case where they do not match, it can be determined that it is not the same virtual server as a virtual server with the configuration item indicating the existing snapshot. In the example of FIG. 8, in the case where a configuration item indicating the snapshot A is first generated, an existing configuration item that indicates the snapshot of the same virtual server is not present. In the case where a configuration item indicating the snapshot B is generated next, it is determined that the existing configuration item 41 indicating the snapshot A is the same virtual server.

Next, in step S303 of FIG. 3, the CPU 11 of the configuration-information management apparatus 1 determines whether the acquired configuration information is a new snapshot. The determination of whether it is a new snapshot is made on the basis of the result of analysis of the system log. More specifically, the CPU 11 makes the determination by comparing the event ID and the timestamp of the existing system log stored in the configuration-information storage unit 131 as a configuration item indicating the snapshot of the same virtual server with the event ID and the timestamp of the newly acquired system log, respectively.

In the example of FIG. 8, assume that the configuration information 31 is stored in the configuration-information storage unit 131 as the configuration item 41 indicating the existing snapshot A. When the configuration item 42 indicating a snapshot B is generated from the configuration information 38, it can be determined that it is the same virtual server as that with the configuration item 41 indicating the existing snapshot A. Next, by analyzing the individual system logs, it can be determined that the snapshot B is a new snapshot, and thus a new snapshot ID is generated in the same process as in step S305.

Thus, according to the first embodiment, a plurality of snapshots on one virtual server can be reliably distinguished. This allows correct ascertainment of the life cycle management of software running on the virtual server, management of the application level of a patch program applied to the OS, and a change in configuration information due to repetition of attachment and detachment of hardware even if the plurality of snapshots are replaced for use in one virtual server.

Since the configuration and the functional block diagram of the configuration-information management apparatus 1 according to a second embodiment of the present invention are the same as those of the first embodiment, a more detained description thereof will be omitted by adding the same reference signs. The second embodiment differs from the first embodiment in that a snapshot ID is not only generated and the generated snapshot ID is given to a configuration item indicating the existing snapshot stored in the configuration-information storage unit 131 but also written to the system log of the virtual server.

Figure 9:
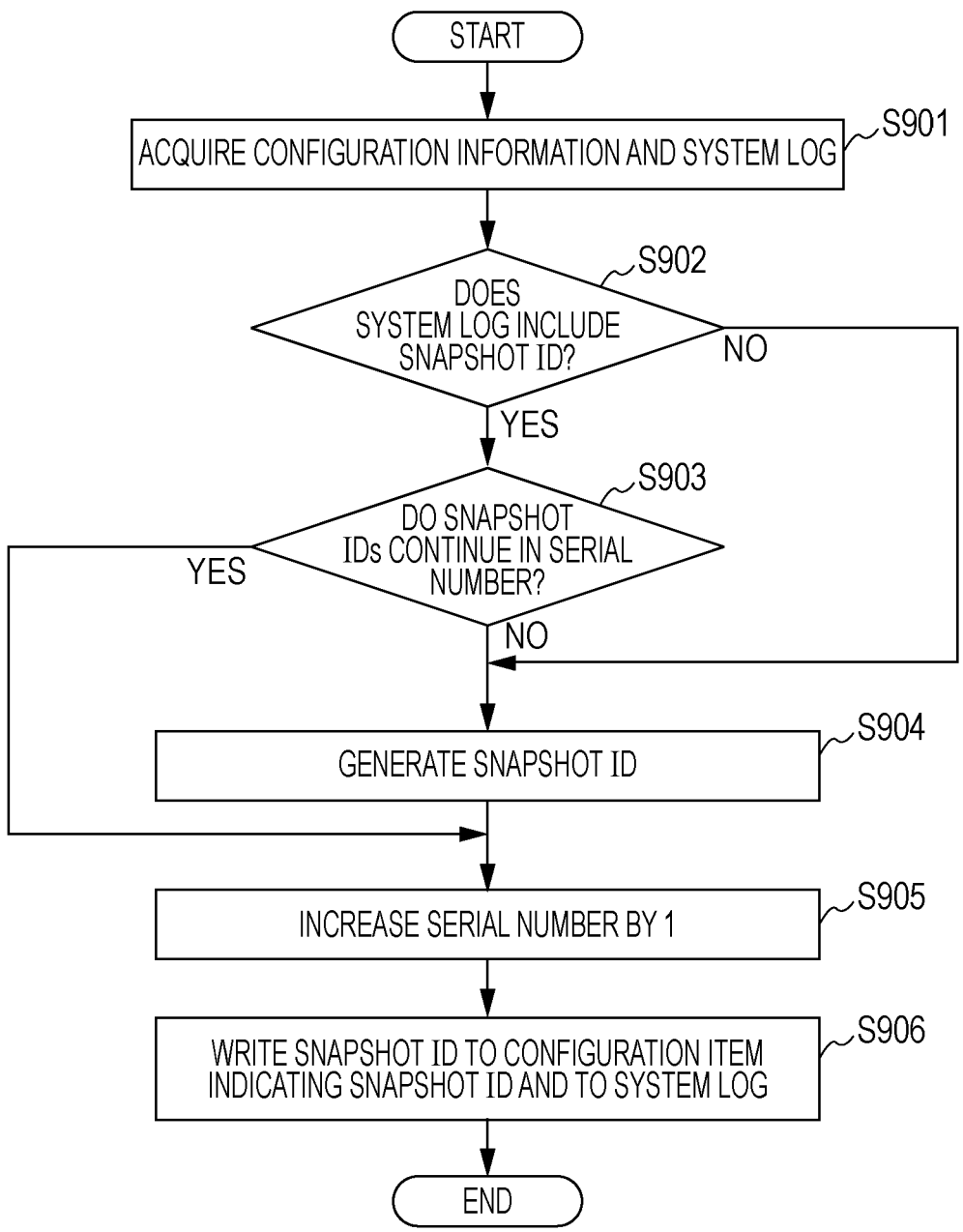
FIG. 9 is a flowchart showing the procedure of the process of the CPU of the configuration-information management apparatus according to an embodiment for acquiring configuration information and system logs of and storing them.

FIG. 9 is a flowchart showing the procedure of the process of the CPU 11 of the configuration-information management apparatus 1 according to the second embodiment for acquiring configuration information and system logs of and storing them. FIG. 9 describes a case where one virtual server is running on each of the external computers 3.

In FIG. 9, the CPU 11 of the configuration-information management apparatus 1 searches the virtual servers running on the external computers 3 and acquires configuration information and system logs for the individual virtual servers (step S901). The CPU 11 determines whether the acquired system logs include a snapshot ID (step S902).

In the case where the CPU 11 determines that no snapshot ID is included (step S902: NO), the CPU 11 generates a snapshot ID (step S904), increases the serial number of the generated snapshot ID by '1' (step S905), and not only gives the snapshot ID to the configuration item indicating the snapshot stored in the configuration-information storage unit 131 but also writes it to the system log of the virtual server (step S906).

Figure 10:
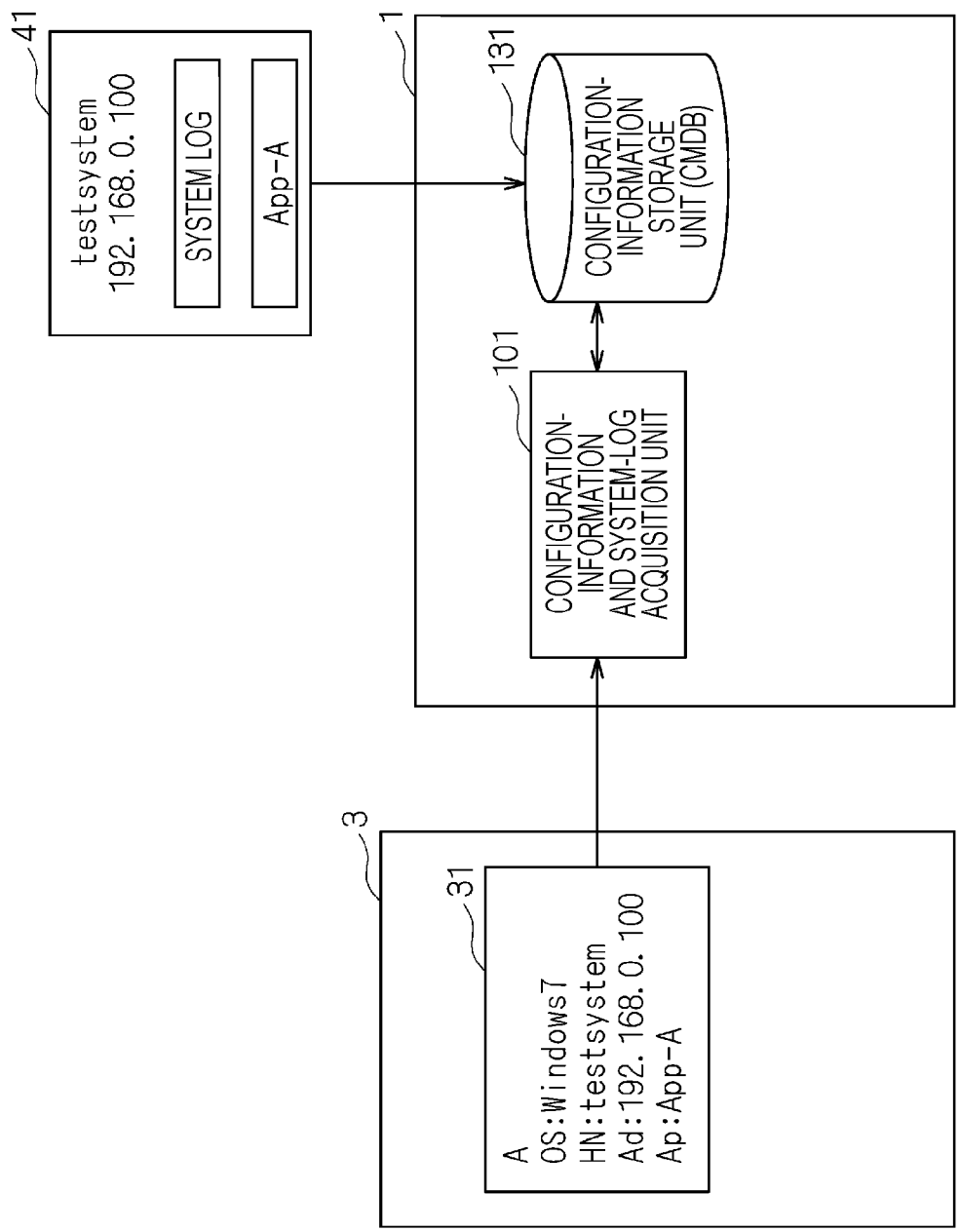
FIG. 10 is a schematic diagram showing the concept of the process of the configuration-information management apparatus according to an embodiment for acquiring configuration information and system logs and storing them.

FIG. 10 is a schematic diagram showing the concept of the process of the configuration-information management apparatus 1 according to an example embodiment for acquiring configuration information and system logs and storing them.

As shown in FIG. 10, the configuration-information and system-log acquisition unit 101 of the configuration-information management apparatus 1 searches the virtual server running on the external computer 3 to read the configuration information 31. The configuration-information and system-log acquisition unit 101 stores the read configuration information 31 in the configuration-information storage unit 131 as the configuration item 41 indicating the snapshot A together with a system log. If it is determined that no snapshot ID is included, the configuration-information and system-log acquisition unit 101 generates a snapshot ID and not only gives the generated snapshot ID to the configuration item 31 indicating the snapshot to be stored in the configuration-information storage unit 131 but also writes it to the system log of the virtual server.

In the example of FIG. 10, a snapshot A is present in which host name is "testsystem", an application "App-A" is active, and IP address is "192.168.0.100". The CPU 11 of the configuration-information management apparatus 1 acquires the configuration information 31 and the system log from the snapshot A and stores them in the configuration-information storage unit 131 as the configuration item 41 indicating the snapshot A.

Referring back to FIG. 9, in the case where the CPU 11 of the configuration-information management apparatus 1 determines that the acquired system log includes a snapshot ID (step S902: YES), the CPU 11 determines whether the snapshot ID continues in serial number to the snapshot ID included in the configuration item indicating the existing snapshot stored in the configuration-information storage unit 131 (the same or increased) (step S903). In the case where the CPU 11 determines that it does not continue in serial number to the snapshot ID included in the configuration item indicating the existing snapshot stored in the configuration-information storage unit 131 (step S903: NO), the CPU 11 generates a new snapshot ID (step S904).

In the case where the CPU 11 determines that it continues in serial number to the snapshot ID included in the configuration item indicating the existing snapshot stored in the configuration-information storage unit 131 (step S903: YES), the CPU 11 can determine that it is the existing snapshot and skips step S904 to increase the serial number included in the snapshot ID by '1' (step S905). In this case, the CPU 11 merges the configuration item indicating the existing snapshot with the configuration information and stores it in the configuration-information storage unit 131 as a configuration item indicating one snapshot. In other words, the CPU 11 updates the configuration item indicating the existing snapshot stored in the configuration-information storage unit 131 in association with the existing snapshot ID. Furthermore, the CPU 11 not only gives the snapshot ID that is increased in serial number by '1' to the configuration item indicating the existing snapshot stored in the configuration-information storage unit 131 but also writes it to the system log of the virtual server (step S906).

In the case where the log information of the latest system log of the system logs of the same virtual server includes a snapshot ID, the included snapshot ID can be used. However, if is not included, a snapshot ID itself needs to be generated. For example, in the case where the snapshot ID is generated from an IP address, the snapshot ID is given serial number to execute generation management. Specifically, a snapshot ID, "ID='192.168.0.199' and serial='0'", is generated. The serial number '0' indicates that it is a snapshot that is first acquired for one virtual server.

Here, the serial number is '0' because it refers to the serial number immediately after the snapshot ID is generated, which is uniquely increased by '1' to generate a snapshot ID with a serial number '1'.

Figure 11:
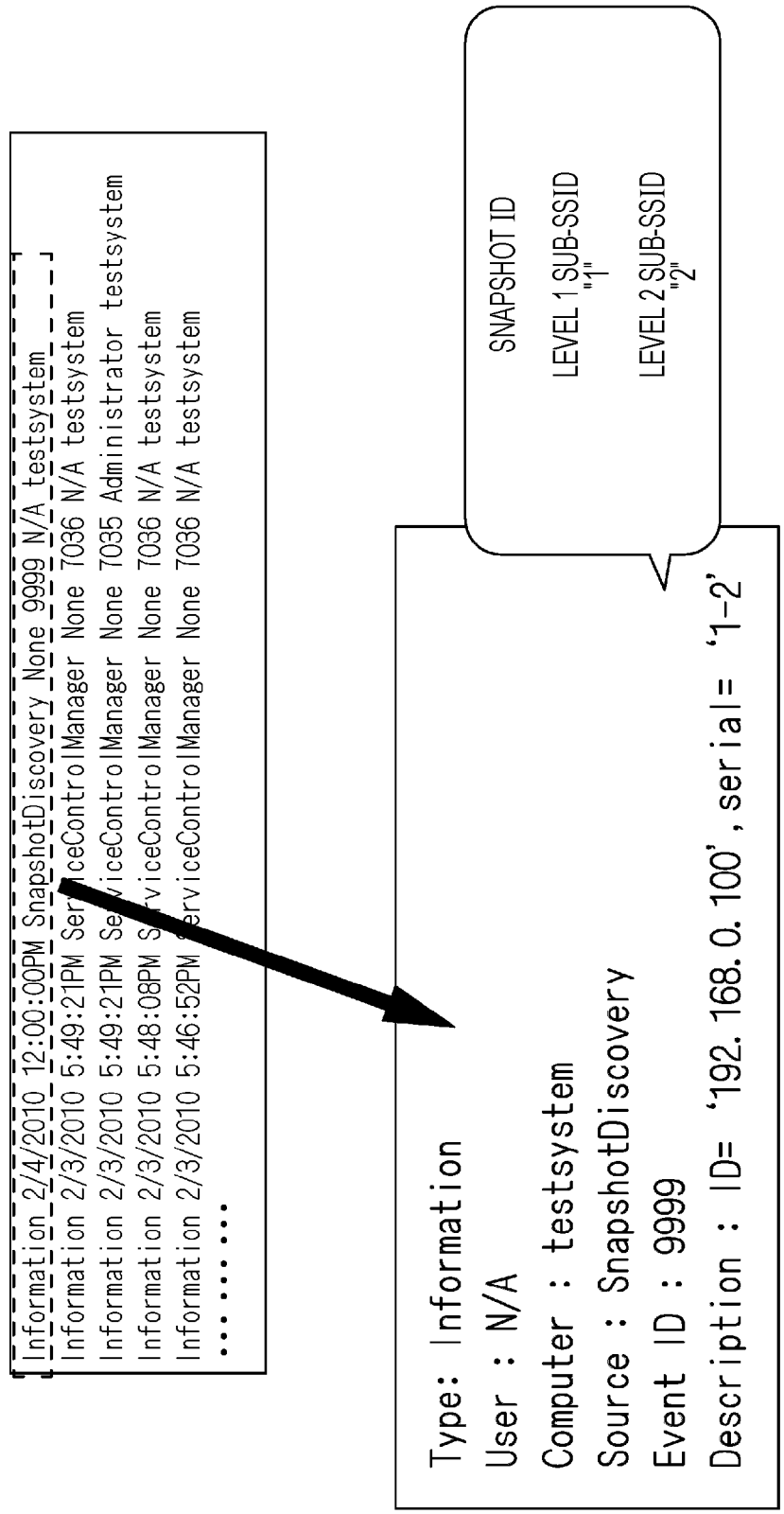
FIG. 11 is a diagram showing an example of a system log acquired from a virtual server of the configuration-information management apparatus according to an embodiment.

The generated snapshot ID is given to a configuration item indicating a snapshot to be stored in the configuration-information storage unit 131 and is also written to the system log of the virtual server. FIG. 11 is a diagram showing an example of a system log acquired from a virtual server of the configuration-information management apparatus 1 according to an example embodiment.

As shown in FIG. 11, the log information of the system log of the virtual server includes, as "Description", a snapshot ID "ID='192.168.0.100', serial='1-2'". The serial number '1-2' is synonymous with a snapshot ID '1-2' acquired by adding the sub-snapshot ID '2' at level 2 to the sub-snapshot ID '1' at level 1 shown in the first embodiment.

Figure 12:
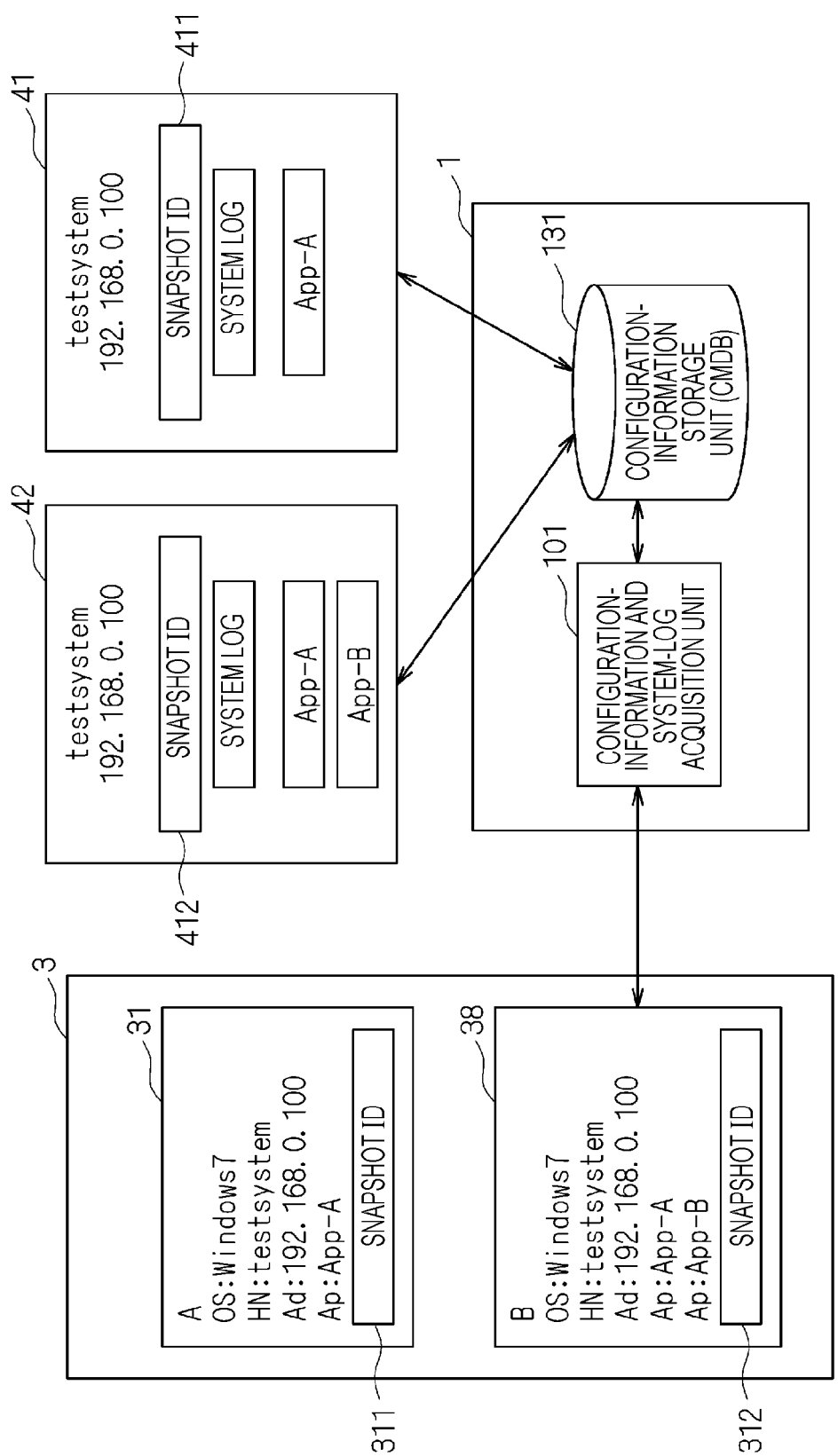
FIG. 12 is a schematic diagram showing the concept of the process of the configuration-information management apparatus according to an embodiment for acquiring configuration information and system logs and storing them when a plurality of snapshots are replaced for use.

FIG. 12 is a schematic diagram showing the concept of the process of the configuration-information management apparatus 1 according to an example embodiment for acquiring configuration information and system logs and storing them when a plurality of snapshots are replaced for use. As shown in FIG. 12, configuration information and system logs can be acquired from a virtual server running on the external computer 3 for the individual snapshots to be replaced for use. In other words, the configuration-information and system-log acquisition unit 101 of the configuration-information management apparatus 1 searches the virtual server running on the external computer 3 and reads configuration information 31 or 38 of each of the snapshots to be replaced for use. Of the read configuration information 31 or 38, the snapshot ID 311 of the configuration information 31 is stored as a snapshot ID 411 of the configuration item 41 indicating the existing snapshot, and the snapshot ID 312 of the configuration information 38 is stored as a snapshot ID 412 of the configuration item 42 indicating the existing snapshot, respectively, in the configuration-information storage unit 131. The configuration-information and system-log acquisition unit 101 stores the read configuration information 31 or 38 in the configuration-information storage unit 131 as the configuration item 41 or 42 indicating the snapshot of each virtual server, respectively, together with a system log.

In the example of FIG. 12, a snapshot A in which host name is "testsystem", an application "App-A" is active, and IP address is "192.168.0.100" and a snapshot B in which host name is "testsystem", two applications "App-A" and "App-B" are active, and IP is "192.168.0.100" are replaced for use. The CPU 11 (configuration-information and system-log acquisition unit 101) reads corresponding configuration information 31 or 38 from the snapshot A or B replaced for use and stores it in the configuration-information storage unit 131 as the configuration item 41 or 42 indicating the snapshot of each virtual server together with a system log.

In step S902 of FIG. 9, the CPU 11 of the configuration-information management apparatus 1 determines whether the acquired system log includes a snapshot ID. In the example of FIG. 12, both of the configuration information 31 and 38 of the two snapshots A and B include snapshot IDs 311 and 312, respectively. Assume that the snapshot ID 311 of the snapshot A is, for example, "ID='192.168.0.100', serial='2'", and is stored in the configuration-information storage unit 131 as the snapshot ID 411 of the configuration item 41 indicating the snapshot.

In the case where the snapshot ID 411 of the configuration item 41 indicating the existing snapshot A is, for example, "ID='192.168.0.100', serial='2'", and the snapshot ID 312 of the acquired snapshot B is, for example, "ID='192.168.0.100', serial='1'", it is determined that they do not continue because the serial numbers are in decreasing order, and thus, a new snapshot ID is generated by the process in step S904.

In the example of FIG. 12, the snapshot ID 312 is updated to, for example, "ID='192.168.0.100.2-1', serial='0'" to show that it is a snapshot derived from the snapshot ID 311 "ID='192.168.0.100'", serial='2' stored in the configuration-information storage unit 131. By increasing the serial number by '1' in step S905, the snapshot ID 312 is set to "ID='192.168.0.100.2-1', serial='1'".

The CPU 11 of the configuration-information management apparatus 1 gives the snapshot ID 312, in which the serial number is increased by '1' in the process of step S906, as a snapshot ID 412 to the configuration item 42 indicating the snapshot stored in the configuration-information storage unit 131 and at the same time writes it also to the system log of the configuration information 38 of the snapshot B. This allows the new snapshot to be easily distinguished from the stored existing snapshot.

According to the second embodiment, as described above, a plurality of snapshots on one virtual server can be reliably distinguished. This allows correct ascertainment of the life cycle management of software running on the virtual server, management of the application level of a patch program applied to the OS, and a change in configuration information due to repetition of attachment and detachment of hardware even if the plurality of snapshots are replaced for use in one virtual server.

The present invention is not limited to the embodiments described above, and various changes and modifications may be made without departing from the spirit of the invention. For example, while the first and second embodiments acquire configuration information and system logs using the configuration-information and system-log acquisition unit 101, analyze the system logs, and gives snapshot IDs as identification information, it is needless to say that a configuration-information acquisition unit that acquires no system log but only configuration information and an identification information providing unit that separately acquires only a system log and analyzes it and gives a snapshot ID may be independently provided.

The invention claimed is:

1. An apparatus comprising:
 a processor; and
 a memory coupled to the processor, wherein the memory comprises instructions which, when executed by the processor, cause the processor to:
 acquire configuration information and a system log for a virtual server running on an external computer connected via a network to form a snapshot of the virtual server;
 compare the acquired system log and an existing system log specified on the basis of the acquired configuration information;
 extract relation information on the relation between the acquired configuration information and another configuration information acquired from the same virtual server; and
 store a snapshot comprising the acquired configuration information and system log in a configuration information storage unit in association with snapshot identification information identifying the configuration information of the virtual server.

2. The apparatus according to claim 1, wherein the instructions further cause the processor to generate the snapshot identification information identifying acquired configuration information responsive to determining that the acquired configuration information and system log represent a new snapshot of the virtual server on the basis of the extracted relation information.

3. The apparatus according to claim 2, wherein generating the snapshot identification information comprises generating the snapshot identification information such that the acquired configuration information and the existing configuration information acquired from the same virtual server are arranged in ascending serial number order.

4. The apparatus according to claim 2, wherein the generated snapshot identification information is written to the existing configuration information and the system log of the virtual server on the external computer.

5. The apparatus of claim 4, wherein comparing the acquired system log and the existing system log comprises comparing the snapshot identification information of the acquired system log and snapshot identification information of the existing system log to determine whether the snapshot identification information of the acquired system log continues in serial number from the snapshot identification information of the existing system log.

6. The apparatus according to claim 1, wherein storing the acquired configuration information and system log comprises storing a change history of the configuration information as a tree structure having a hierarchical structure.

7. The apparatus of claim 1, wherein storing the acquired configuration information and system log comprises merging the acquired configuration information and the another configuration information responsive to determining the another configuration information represents an existing snapshot of the virtual server having existing snapshot identification information.

8. The apparatus of claim 7, wherein the instructions further cause the processor to generate a sub-snapshot identifier associated with a change in configuration information with respect to the existing snapshot.

9. The apparatus of claim 1, wherein the snapshot identification information comprises a hash value of timestamp information.

10. The apparatus of claim 1, wherein the snapshot identification information comprises a snapshot identifier derived from an Internet Protocol address.

11. A method comprising:
 acquiring configuration information and a system log for a virtual server running on an external computer connected via a network to form a snapshot of the virtual server;
 comparing the acquired system log and an existing system log specified on the basis of the acquired configuration information;
 extracting relation information on the relation between the acquired configuration information and another configuration information acquired from the same virtual server; and
 storing the acquired configuration information and system log in a configuration information storage unit in association with snapshot identification information identifying the configuration information of the virtual server.

12. The method according to claim 11, further comprising generating the snapshot identification responsive to determining that the acquired configuration information and system log represent a new snapshot of the virtual server on the basis of the extracted relation information.

13. The method according to claim 12, wherein generating the snapshot identification information comprises generating the snapshot identification information such that the acquired configuration information and the existing configuration information acquired from the same virtual server are arranged in ascending serial number order.

14. The method according to claim 12, wherein the generated snapshot identification information is written to the existing configuration information and the system log the virtual server on the external computer.

15. The method of claim 14, wherein comparing the acquired system log and the existing system log comprises comparing the snapshot identification information of the acquired system log and snapshot identification information of the existing system log to determine whether the snapshot identification information of the acquired system log continues in serial number from the snapshot identification information of the existing system log.

16. The method according to claim 11, wherein storing the acquired configuration information and system log comprises storing a change history of the configuration information is stored as a tree structure having a hierarchical structure.

17. The method of claim 11, wherein storing the acquired configuration information and system log comprises merging the acquired configuration information and the another configuration information responsive to determining the another configuration information represents an existing snapshot of the virtual server having existing snapshot identification information.

18. The method of claim 17, the method further comprising:
generating a sub-snapshot identifier associated with a change in configuration information with respect to the existing snapshot.

19. The method of claim 11, wherein the identification information comprises one of a hash value of timestamp information or a snapshot identifier derived from an Internet Protocol address.

20. A computer program product comprising a non-transitory computer readable medium having a computer readable program embodied therein, wherein the computer readable program, when executed on a computing device, causes the computing device to:
acquire configuration information and a system log for a virtual server running on an external computer connected via a network to form a snapshot of the virtual server;
compare the acquired system log and an existing system log specified on the basis of the acquired configuration information;
extract relation information on the relation between the acquired configuration information and another configuration information acquired from the same virtual server; and
store a snapshot comprising the acquired configuration information and system log in a configuration information storage unit in association with snapshot identification information identifying the configuration information of the virtual server.

* * * * *